United States Patent Office 2,721,184
Patented Oct. 18, 1955

2,721,184

PROCESS FOR PREPARING ACTIVATED CARBON

Alexis Voorhies, Jr., Baton Rouge, La., assignor to Esso Research and Engineering Company, a corporation of Delaware No Drawing. Application July 11, 1950,
Serial No. 173,229

2 Claims. (Cl. 252—445)

The present invention is concerned with a process for the preparation of carbon which has a high selectivity for the separation of hydrocarbons from each other generally according to molecular weight. By preparing the carbon in accordance with the present invention, an activated carbon having a greatly improved selectivity for heavier hydrocarbons as compared to lighter hydrocarbons is obtained. In accordance with the present invention a selective carbon of this type is produced by activating a char at a temperature in the range from about 900° F. to 1600° F., preferably 1000° F. to 1400° F., followed by deoxygenating the char in order to prevent loss of activity of the same. In the deoxygenation both free oxygen and chemically combined oxygen are removed.

It is well known in the art to prepare activated carbons by various procedures. These carbons are secured from various sources such as peat, sawdust, bituminous coal, petroleum coke, nut shells, and the like. However, the activity of the respective carbons varies appreciably depending upon the sources from which they are derived and upon the activation procedure. A very desirable carbon is one which is secured, for instance, from coconut charcoal. This is produced by carbonizing the coconut shells at about 700° F. to 1200° F., preferably in vacuum or in the presence of steam, followed by steam activation of the char at about 900° F. to 1600° F. Activated carbons may also be made from peat or sawdust or from mixtures of the two by reaction with potassium sulfide at about 1600° F. to 1700° F. followed by steam activation at about 900° F. to 1300° F.

In all these operations the carbon produced is activated by heating in the presence of steam at elevated temperatures which have generally been in the range below about 1500° F. It has now been discovered, however, that if the activated carbon is given an additional treatment to remove adsorbed oxygen therefrom, unexpected and improved results are secured. In accordance with the present invention it is essential that the deoxygenated activated carbon be handled in a manner to exclude oxygen therefrom both before and during its use as an adsorbent medium.

The activated carbon of the present invention is prepared by coking the carbonaceous material, for example, coconut shells or bituminous coal, at about 700° F. to 1200° F. in a vacuum or in the presence of steam or an inert gas. The resulting char is then activated by steaming at about 1200° F. to 1600° F., preferably in a fluid type reactor. The activated carbon is then handled in a manner to remove any adsorbed or occluded oxygen therefrom. This may be achieved by a number of satisfactory procedures, as for example: (1) mild treatment with hydrogen under conditions described below; (2) by vacuum desorption with or without attendant stripping; (3) by the reaction of the oxygen with carbon at elevated temperatures. Deoxygenation also may be achieved by combinations of the foregoing methods.

For example, when employing elevated temperatures to remove the adsorbed oxygen, the carbon, after activation at a temperature in the range from 1200° F. to 1600° F., is raised to a temperature of about 1800° F. to 2700° F. in the presence of an inert gas such as nitrogen, helium, argon, methane and the like. It is preferred that the temperature be in the range from about 2000° F. to 2500° F. The inert gas, for example, nitrogen, which is employed must be substantially completely free of oxygen. It is very essential that the oxygen concentration be less than about .1% by volume, and preferably, be less than .05%. It is desirable that the carbon be held at this temperature for a period of at least two hours, preferably for a period of from about 3 to 4 hours.

A particularly desirable method of removing adsorbed oxygen is to treat the activated char at a temperature in the range from about 400 to 1000° F., preferably at a temperature of about 500° F. with hydrogen. As pointed out heretofore, by preparing the carbon in accordance with the present invention, the activated carbon product will have a greater selectivity for higher molecular weight hydrocarbons than for lower molecular weight hydrocarbons. The activated carbon product, however, is also adapted for the segregation of various types of hydrocarbon constituents such as the separation of n-paraffins from iso-paraffins. The n-paraffins are adsorbed preferentially on the carbon. The carbon is removed and the n-paraffins recovered by desorption, preferably by treatment with steam. The n-paraffins may also be recovered by treating the carbon with other hydrocarbons boiling in a different boiling range. The n-paraffins thus recovered are relatively pure. It is also within the scope of the present invention to employ the highly selective carbon to fractionate mixtures of gaseous hydrocarbons containing 1 to 5 carbon atoms per molecule including polymerizable constituents. For example, a $C_2$—$C_3$ refinery stream, coke-oven gas containing hydrogen sulfide, and the like, are resolved into components by adsorption with activated carbon.

The activated carbon product prepared as described may be used in a treatment of hydrocarbons either in the liquid or gaseous phase. If the vapor phase operation be conducted, it is preferred that the temperatures not exceed about 350° F. Pressures may be as high as 50 to 100 pounds per square inch. Desorption of the adsorbed product is preferably carried out by subjecting the carbon containing the adsorbed products to a temperature in the range from about 400 to 700° F. If a liquid phase operation be utilized, the adsorption temperatures may be as high as 150° F. The pressures likewise may vary appreciably.

It is within the scope of the present invention to employ the activated carbon in the fluidized state. Under these conditions the diameter size of the carbon particles is in the range from about 20 to 120 microns and higher with the bulk of the particles in the range of 20 to 80 microns. The velocity of the upflowing gases with char of this particle size is in the range from about 0.1 to 15 feet per second, preferably .3 to 3.0 feet per second, depending upon the pressure employed in the adsorption process. A deoxygenated activated carbon prepared in accordance with the present invention is particularly effective in treating feed gases containing diolefins boiling above the boiling range of butane. It has been found that when feed gases containing diolefins boiling in the boiling range of butane and higher, relatively rapid deactivation of the activated carbon results. It is felt that adsorbed oxygen is a potent polymerization promoter, particularly in the case of the active mono-olefins and diolefins. The resultant polymerization and copolymerization products deposit on the char and thus reduce its activity selectivity materially. Thus, by eliminating the oxygen promoter polymerization of these active olefins is materially reduced. Typical char deactivants are butadiene, the pentadienes, butenes, pentenes and higher olefins, and their polymerization and copolymerization products. These olefin monomers are found in such gases as coke oven gas, residue gas from an oil absorption unit, etc. Approximate analysis of a refinery residue gas which is treated with activated carbon to separate $C_2$ and $C_3$ components therefrom by adsorption is as follows:

| | Percent |
|---|---|
| $N_2$ | 10–15 |
| $H_2$ | 10–15 |
| $CO$ | 2–3 |
| $C_1$ | 30–45 |
| $C_2H_4$ | 7–8 |
| $C_2H_6$ | 5–10 |
| $CO_2$ | 4–5 |
| $H_2S$ | |
| $C_3H_6$ | 15–18 |
| $C_3H_8$ | 1–5 |
| $C_4H_8$ | 0.05–0.3 |
| $i\text{–}C_4H_{10}$ | 0.3–0.6 |
| $n\text{–}C_4H_{10}$ | 0.1–0.2 |
| $C_5H_{10}$ | <0.1 |
| $C_6+$ | <0.05 |

Mild hydrogenation of the activated carbon is carried out at temperatures of 400–1000° F. at atmospheric or subatmospheric pressures. The hydrogen is employed in amounts of approximately 10 to 50 standard cubic feet per hour per pound of carbon for a period of 15 minutes to 4 hours. Deoxygenation of the char by hydrogenation is especially recommended when the oxygen on the carbon is in the form of chemically combined oxygen.

Vacuum desorption is carried out by heating the activated carbon at a temperature in the neighborhood of 300–500° F. under the highest vacuum obtainable preferably at about a few millimeters pressure. This vacuum desorption is carried out with or without attendant stripping with an inert gas such as $N_2$ or steam free of oxygen.

The reaction of the carbon itself with adsorbed oxygen occurs by heating the carbon to temperatures of 500–1000° F. The actual reaction temperature depends upon the reactivity of the particular carbon itself. Some activated carbons have such highly active centers that they ignite spontaneously in the air at atmospheric temperatures. However, an elevated temperature in the absence of air is preferred for deoxygenation of the carbon.

The present invention may be more readily understood by the following example illustrating the same:

*Example 1*

(a) A carbon prepared by carbonizing bituminous coal at a temperature of from 700° F. to 1200° F. was activated with steam at a temperature of 1200° F. to 1600° F. This active carbon was employed in the treatment of residue gas of the above approximate composition in the absence of air at 120° F. for the recovery of $C_2$ and $C_3$ components therefrom. The carbon was removed and desorbed by treatment with pure nitrogen at a temperature of 500° F. After ten cycles the activity of the charcoal had decreased to about 80% of its original activity.

(b) In another operation a similar carbon was employed except that the activated carbon was deoxygenated by treatment with hydrogen at 500° F. The deoxygenated carbon was then used to recover $C_2$ and $C_3$ hydrocarbon components from residue gas in the same manner as in (a). After five cycles the activity still remained at 100%. The treatment in each cycle consisted of the following:

(c) Ten grams of char in a ¾" tube was pretreated with hydrogen at 500° F. and at atmospheric pressure for 15 minutes. This char was then treated with a total of 6 liters of residue gas for 15 minutes. The char was desorbed for 15 minutes with nitrogen, using 2 liters of nitrogen per minute. This step was also carried out at atmospheric pressure. After 5 cycles, the activity of the char was still 100%.

(d) In addition to promoting polymerization of olefin hydrocarbons free oxygen is especially detrimental to carbon capacity when a gas being resolved contains $H_2S$. $H_2S$ alone does not contribute significantly to the rate of deactivation of carbon. However, in the presence of oxygen $H_2S$ is oxidized to sulfur which deposits on the carbon. Due to its high boiling point sulfur is difficult to remove under ordinary description temperatures. Thus the adsorption capacity of the carbon is diminished. It has been found that the addition of 4.4% $H_2S$ to a butadiene refinery $C_3$—$C_4$ stream did not significantly increase the rate of deactivation attending adsorption-desorption of this mixture on a Columbia "G" carbon. However, the presence of both 4.4% $H_2S$ and 1% $O_2$ increased the rate of deactivation of the carbon 50% over a comparable number of cycles and produced a 4 to 5 fold increase in the weight of deposits on the carbon.

The deoxygenation of the activated carbon as set forth in this invention may be carried out at any of a number of stages of the adsorption-desorption system. Generally, it is preferred to supply a mild hydrogenation treat to the original carbon charge, to the make-up char, and to the char emerging from the reactivation unit prior to its re-use in the adsorption cycle.

The activated carbon prepared in accordance with the present invention may be used to separate one hydrocarbon constituent from another, generally according to molecular weights. These carbons are particularly adapted for the segregation of saturated hydrocarbons from unsaturated hydrocarbons of the same number of carbon atoms. It is, however, to be understood that the carbons prepared in accordance with the present invention may be used in other adsorptive processes such as in the separation of oxygen and sulfur-containing compounds from water or oil, aromatics from other hydrocarbons, or straight chain alcohols from branched chain alcohols, and the like.

What is claimed is:

1. A process for the preparation of an improved activated carbon resistant to deactivation upon contact with hydrocarbon mixtures including polymerizable hydrocarbons, which consists in activating a carbonaceous material by contacting it with steam at a temperature of 900° to 1600° F. and thereafter deoxygenating the steam treated carbon by contacting it with hydrogen at a rate of 10 to 50 s. c. f. per hour per pound of carbon for a period of 15 minutes to 4 hours at a pressure not above atmospheric at a temperature of 400° to 1000° F.

2. A process according to claim 1 in which the contacting with hydrogen occurs at a temperature of about 500° F.

References Cited in the file of this patent

UNITED STATES PATENTS

| 2,405,206 | Goss et al. | Aug. 6, 1946 |
| 2,516,233 | McKinnis | July 25, 1950 |
| 2,556,859 | Vesterdal | June 12, 1951 |

FOREIGN PATENTS

| 292,798 | Great Britain | June 28, 1928 |

OTHER REFERENCES

Berl, "Trans. Faraday Soc., vol. 34, 1040–52 (1938).